United States Patent [19]
Howell

[11] 3,880,622
[45] Apr. 29, 1975

[54] STACK GAS REHEATING FOR FLUE GAS SCRUBBING SYSTEM

[75] Inventor: Brooks Mason Howell, East Granby, Conn.

[73] Assignee: Combustion Engineering, Inc., Windsor, Conn.

[22] Filed: Nov. 23, 1973

[21] Appl. No.: 418,702

[52] U.S. Cl. ............... 55/222; 261/17; 261/129; 261/151; 261/152; 261/DIG. 9
[51] Int. Cl. ............................................. B01d 47/00
[58] Field of Search ...... 55/222; 110/49 R; 261/152, 261/151, DIG. 77, 17, 30, DIG. 9, DIG. 34, 129; 34/72; 165/108

[56] References Cited
UNITED STATES PATENTS

| | | |
|---|---|---|
| 917,185 | 4/1909 | Taylor................................. 55/222 |
| 2,035,628 | 3/1936 | Whitmer et al.................... 55/222 X |
| 2,057,579 | 10/1936 | Kurth................................. 55/222 X |
| 2,334,427 | 11/1943 | McGrath........................... 55/222 X |
| 2,785,879 | 3/1957 | Cramp.......................... 261/DIG. 9 |
| 3,119,239 | 1/1964 | Sylvan.......................... 261/DIG. 34 |
| 3,320,906 | 5/1967 | Domahidy......................... 261/17 X |
| 3,473,331 | 10/1969 | Fernandes......................... 55/222 X |

FOREIGN PATENTS OR APPLICATIONS

| | | |
|---|---|---|
| 58,364 | 1/1941 | Denmark .............................. 261/30 |

Primary Examiner—Tim R. Miles
Assistant Examiner—Richard L. Chiesa

[57] ABSTRACT

Processed gas from the wet scrubber in the combustion gas purification system of a power plant is dried by direct contact heat transfer with dry recirculated gas that is diverted from the processed gas line and heated prior to introducing it into the wet processed gas stream.

8 Claims, 2 Drawing Figures

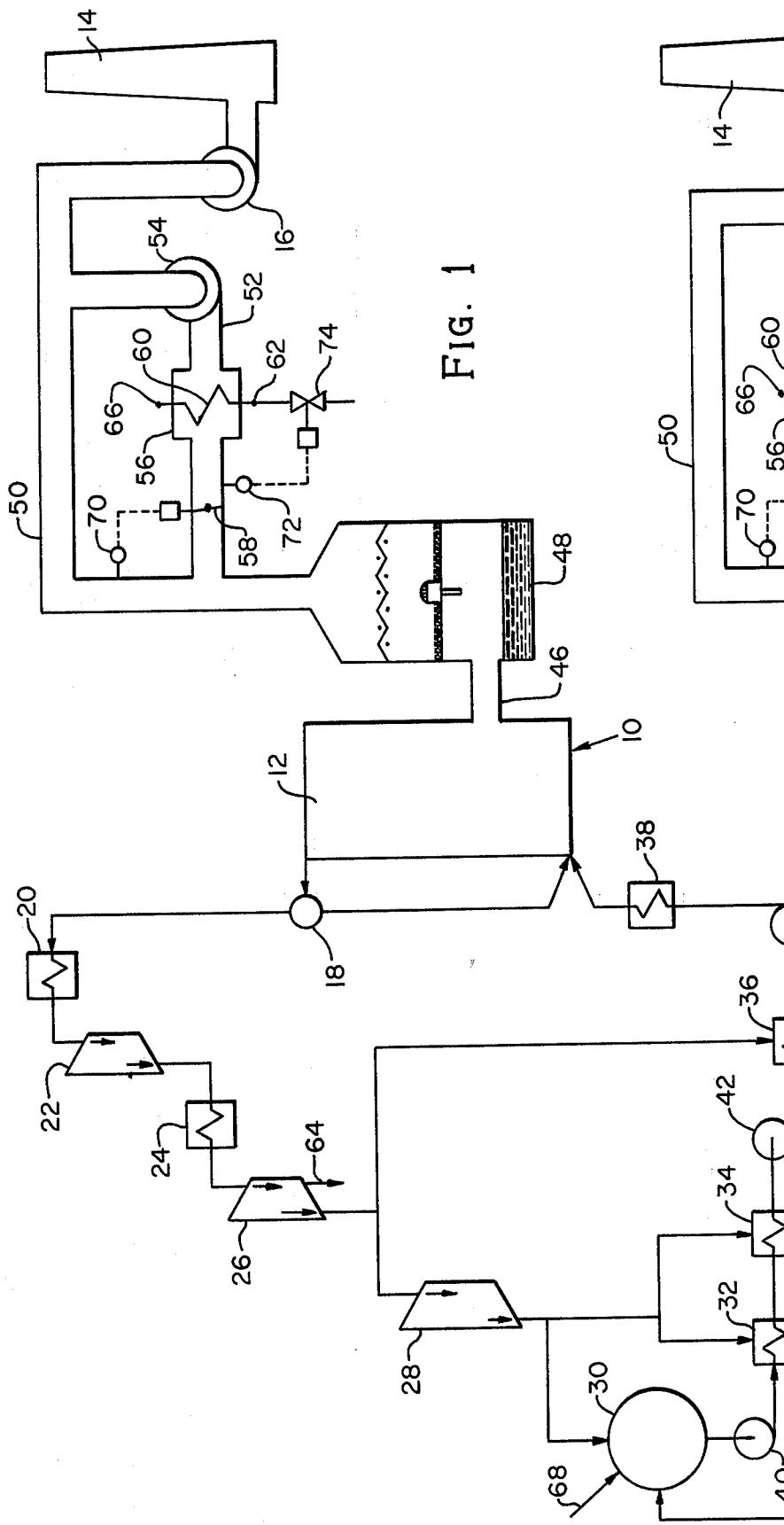

STACK GAS REHEATING FOR FLUE GAS SCRUBBING SYSTEM

BACKGROUND OF THE DISCLOSURE

Air pollution has become a major problem in recent years and there is currently much time, effort and expense being put forth to devise economical schemes for reducing this pollution. One of the many sources of air pollution is the flue gases emitted from fuel burning equipment such as steam generating units. The sulfur oxides, $SO_2$ and $SO_3$, are of major concern as air pollutants in such flue gases. The particulate matter such as fly ash and other dust particles also contribute to the pollution problem if not completely removed. One system for cleansing flue gases of their sulfurous and particulate impurities utilizes a wet scrubber in which intimate contact of the flue gas with wash water effects the purification of the gas. The details of such a system are described in U.S. Pat. No. 3,320,906 issued May 23, 1967 to George Domahidy and assigned to the assignee of the present invention.

In practice the form of wet scrubber utilized in such a system is one in which the flue gases and wash water are passed through a filter bed within which intimate contact between the two media is effected. An effective form of wet scrubber that may be utilized in the described system is one employing a bed of marbles which, when set in motion by the flowing fluids, produces a highly efficient mixture of the wash water and the flue gas.

Problems arise in the use of such systems however in that the gases emerging from the scrubber are moisture laden and, moreover, oftentimes contain a carryover of entrained liquid and dissolved solids. Therefore, without further processing the gases flowing from the scrubber are likely to have a deleterious effect upon the induced draft fan located in the system between the scrubber and the stack. By admitting such gases to the fan, the operational efficiency thereof is reduced thereby increasing the operating costs of the system. The admission of such gases to the fan further gives rise to the danger of corroding the fan components due to the precipitation on the surfaces thereof of the solids carried by the gases.

Additional processing of the gases is desirable for the further reason that, absent such processing, the discharge from the stack of moisture-laden gases would result in a visible steam plume thereby producing an adverse environmental effect.

In the past these problems have been alleviated by locating heat exchange surface within the gas pass downstream of the wet scrubber for the purpose of heating the gases to dryness before they reach the induced draft fan. So heating the gases reduces their wetness and corrosive effect upon the fan and raising their temperature to the point necessary for drying reduces the possibility of creating a visible plume from the stack. While such measures provide the beneficial effects alluded to they do not provide a total solution to the problem in view of the fact that the heat exchanger employed for heating the gases is subjected to scaling and other corrosive effects due to the precipitation of the entrained elements on the heat transfer surfaces thereof. Thus these heat transfer surfaces must constantly undergo maintenance and/or replacement thereby adding measureably to the costs of operating the system.

It is to the improvement of such systems therefore that the present invention is directed.

SUMMARY OF THE INVENTION

According to the present invention there is provided an improved combustion gas purification system including a wet scrubber and means for heating the moisture laden gases emerging from the scrubber for drying purposes and for preventing the occurrence of a steam plume at the gas discharge stack. In the system of the present invention the moist gases are heated by intermixture with a recirculated portion of dry, previously processed gas whose temperature has been raised by passing it through a heat exchanger disposed in the recirculation line. By means of this arrangement the heat transfer surface of the heat exchanger is physically removed from the moist gas stream and is itself contacted only by dry gas. Because the moist gas stream does not impinge on the heat transfer surfaces of the heat exchanger these surfaces are protected against the possibility of undue scaling and corrosion that would otherwise be caused by the precipitation thereon of the elements entrained in the moisture laden gases.

It is accordingly a principal object of the invention to provide an improved combustion gas purification system.

It is another object of the invention to provide an improved combustion gas purification system including a wet scrubber and means for heating the moist gases emerging from the scrubber prior to their discharge to the atmosphere.

It is yet another object of the invention to provide a combustion gas purification system of the described type in which the heat transfer surface of the heat source is protected against the effects of scale and corrosion caused by the precipitation of the adverse elements entrained in the moist gas stream thereupon.

For a better understanding of the invention, its operating advantages and the specific objects obtained by its use, reference should be made to the accompanying drawings and description which relate to a preferred embodiment of the invention.

BRIEF DESCRIPTION OF THE DRAWINGS

FIG. 1 is a schematic representation of a power plant utilizing a gas purification system of the present invention; and FIG. 2 is a partial schematic illustration of a modified form of gas purification system of the type illustrated in FIG. 1.

DESCRIPTION OF THE PREFERRED EMBODIMENT

The drawing illustrates a power plant system utilizing gas purification apparatus of the present invention for cleansing the combustion gases prior to their discharge from the system. In the drawing, reference character 10 denotes a steam generating unit having a furnace 12 in which fuel is burned and the combustion gases resulting therefrom utilized for the generation of steam for use in the power plant system. Circulation of the combustion gases through the system with ultimate discharge from stack 14 is effected by an induced draft fan 16. The illustrated steam generator 10 is of well known construction having its walls lined with tubes in which a vaporizable liquid is heated and the resulting mixture of steam and water passed to a drum 18. Within the drum 18 the mixture is separated into its component parts of steam which is used in the plant and water which is recirculated through the tubes of the steam generator. The separated steam is passed by means of steam delivery lines in a substantially closed cycle seriatim through a superheater 20, high pressure turbine 22, reheater 24, intermediate pressure turbine 26 and low pressure turbine 28. The spent steam discharged from the low pressure turbine 28 is condensed in condensor 30 from whence it is returned to the steam generating unit 10. In returning to the steam generating unit 10 the condensate is caused to pass through a number of heat exchangers 32, 34 and 36 utilized for feedwater treatment prior to being admitted to the economizer 38 which forms part of the steam generating unit. Circulation of the working medium is effected by means of a series of pumps indicated as condensate pumps 40, booster pump 42 and boiler feed pump 44. Heating fluid for the various heat exchangers 32, 34 and 36 is in the form of extraction fluid from the intermediate and low pressure turbines 26 and 28 respectively.

The combustion gases generated in the furnace 12 of the steam generator 10 are discharged therefrom through gas outlet 46 into a wet scrubber 48. It is the function of the wet scrubber 48 in the described arrangement to remove impurities, such as sulfur compounds and particulate matter from the flowing combustion gases by contacting them with wash water. The particular wet scrubber 48 disclosed herein does not form an integral part of the present invention as the scrubber may be selected from any of the several types of commercially available wet scrubbers. Two such scrubbers are the Peabody Gas Scrubber by the Peabody Engineering Corporation of New York, N.Y. and the Floating Bed Scrubber by Aerotec Industries, Inc. of Greenwich, Conn. It will be appreciated that only so much of the gas purification system is described herein as is necessary for an understanding of the present invention. The aforementioned U.S. Pat. No. 3,320,906 is referred to for a complete description of the manner in which gas purification is effected.

The combustion gases processed in wet scrubber 48 emerge therefrom and are caused to flow under the action of the induced gas fan 16 through flow conductor 50 to the gas discharge stack 14. According to the present invention a gas recirculation line 52 is provided with its inlet end attached in fluid communication with the conductor 50 upstream of the induced gas fan 16. The outlet end of line 52 connects with the conductor 50 immediately downstream of the wet scrubber 48. Interposed in the line 52 are a gas recirculation fan 54 for inducing gas flow through the line, a heat exchanger 56 providing a heat source for raising the temperature of the recirculated gases and a regulating damper 58 for controlling the rate of recirculated gas flow. The heat exchanger 56 contains a tubular coil 60, or the like, through which a relatively high temperature fluid is conducted for the indirect transfer of heat to the recirculated gases in order to raise the temperature thereof. As shown, the coil 60 is adapted to pass extraction steam from the intermediate pressure turbine 66 and to discharge the same into the condensor 30. Therefore, suitable flow conductors (not shown) are provided to connect the heat exchange coil inlet, indicated as 62 with an extraction line 64 from the intermediate pressure turbine 66. Similarly, suitable flow conductors (also not shown) are provided to connect the heat exchange coil outlet 66 with condensor return line 68. Although not described herein it should be realized that heating medium for the heat source can be extracted from and returned to other points in the power plant cycle.

The operation of the hereindescribed system is as follows. Fuel and air are burned in the furnace 12 of steam generating unit 10 and the combustion gases resulting therefrom utilized to generate high temperature steam for driving the respective turbines 22, 26, 28 to perform useful work. The combustion gases exit the furnace 12 through gas outlet 46 and are conducted to the wet scrubber 48 where they are processed as hereinbefore set forth to purify the same prior to their discharge to the atmosphere. The processed gases are passed through conductor 50 from the scrubber 48 to stack 14 under the influence of the induced gas fan 16. At a location in the conductor 50 intermediate the scrubber 48 and the fan 16 a predetermined amount of the processed gases, as regulated by damper 58, is diverted from the conductor and returned through gas recirculation line 52 to a location upstream in the conductor adjacent the outlet of the wet scrubber 48. In flowing through line 52 the recirculated gases are heated to an elevated temperature in heat exchanger 56 by extracting heat from the heating fluid that is passed through heat transfer coil 60. The heated recirculated gases are discharged into the conductor 50 where they mix with the gases exiting the wet scrubber 48. In mixing with the moist gases emerging from the scrubber the high temperature recirculated gases effect drying of the gases by direct contact heat transfer.

In the described system, where processed gases containing about 10 percent moisture at a temperature of from 115°F to 140°F are discharged from the wet scrubber 48, drying is accomplished in the conductor 50 by recirculating about 20 percent of the gas flow through line 52 and by heating the recirculated gas to a temperature in the range of 300°F to 400°F in heat exchanger 56. Heating the recirculated gases to such a temperature can be effected by flowing extraction steam in the range of about 400°F to 500°F through the heat transfer coil 60. The resultant gas mixture achieves a temperature of about 160°F to 170°F which is ample for drying purposes and for preventing a visible plume at the gas discharge stack.

A simplified system for regulating the operation of the described apparatus includes a sensor 70 for sensing the mixed gas temperature in conductor 50 and for actuating the damper 58 in response thereto. A second sensor 72 is also included for sensing recirculated gas temperature in line 52 immediately downstream of the heat exchanger 56, which sensor is effective to control the operation of a flow regulating valve 74 for controlling the flow of heating fluid to the heat transfer coil 60.

It will thus be appreciated that, by reason of the present invention, moisture laden gases emerging from the wet scrubber 48 in the described gas purification system can be dried without danger of fouling the heat transfer apparatus. Because the heat exchanger 56 utilized for drying purposes in the described system is physically removed from the conductor 50 and because the heat transfer surface represented by coil 60 in the heat exchanger is exposed only to dry gases from a location downstream in the conductor 50, the possibility of producing scale and other corrosive deposits on the heat transfer surfaces in the heat exchanger is removed.

In FIG. 2 of the drawing there is illustrated a partial schematic representation of an alternative form of apparatus according to the invention. For the sake of simplicity only that portion of the system located between the wet scrubber 48 and the stack 14 is shown. It should be understood that the remainder of the system is similar to that illustrated in FIG. 1. In this alternative form of apparatus the inlet end of the recirculated gas line 52 is caused to communicate with conductor 40 downstream of the induced draft fan 16. The fan 16 is therefore utilized both for circulating the main stream of gases through conductor 50 and for recirculation of the diverted stream through line 52. By reason of this innovation the need for a separate recirculating fan 54 is eliminated thereby reducing the capital costs of the system.

It will be understood, therefore, that variations, changes in the details, materials, and arrangements of the parts which have been hereindescribed and illustrated in order to explain the nature of the invention may be made by those skilled in the art within the principles and scope of the invention. What is sought to be protected herein is as recited in the appended claims.

What is claimed is:

1. In a system for drying moist process gases by the application of heat, the combination comprising:
   a. a conductor;
   b. means for flowing moist process gases through said conductor;
   c. a gas recirculation line operatively connected to said conductor for extracting at least part of the gases flowing therethrough, the inlet end of said gas recirculation line communicating with said conductor at a downstream position in the gas flow sense therealong and the outlet end thereof communicating with said conductor at an upstream location therein;
   d. means for passing the extracted gases through said gas recirculation line from the inlet to the outlet thereof;
   e. a heater operatively disposed in said gas recirculation line for heating the gases flowing therethrough; and
   f. means for discharging the gases heated in said gas recirculation line in mixed relation with the moist process gases in said conductor whereby the same are dried by the transfer of heat from said heated gases.

2. Apparatus as recited in claim 1 including a first fan operatively disposed in said conductor downstream of the point of communication of the inlet end of said line, and a second fan in said line for circulating the extracted gases therethrough.

3. Apparatus as recited in claim 1 including a fan operatively disposed in said conductor upstream of the point of communication of the inlet end of said line.

4. The combination as recited in claim 1 in which the inlet of said gas recirculation line communicates with said conductor in a region containing substantially moisture-free gases.

5. The combination as recited in claim 1 in which said heater means includes a tubular heat exchanger and means for circulating heating fluid through the tubes thereof.

6. The combination as recited in claim 1 including means for regulating the heat content of the gases discharged from said gas recirculation line in response to the temperature of the gas mixture flowing in said conductor intermediate the inlet and the outlet of said gas recirculation line.

7. The combination as recited in claim 6 in which said heat content regulating means includes a damper in said gas recirculation line for regulating the flow of extracted gases therethrough.

8. The combination as recited in claim 7 in which said heater means includes a tubular heat exchanger, means for circulating heating fluid through the tubes thereof and means for regulating the flow of heating fluid through said tubes in response to the temperature of said recirculated gases adjacent the outlet of said heat exchanger.

* * * * *